E. B. DAILEY.
TRUCK CONSTRUCTION.
APPLICATION FILED JAN. 10, 1906.

927,497

Patented July 13, 1909.

WITNESSES:

INVENTOR
Edmund B. Dailey
BY Warfield & Duell
ATTORNEYS

UNITED STATES PATENT OFFICE.

EDMUND B. DAILEY, OF OMAHA, NEBRASKA, ASSIGNOR TO EDWARD H. HARRIMAN, OF ARDEN, NEW YORK.

TRUCK CONSTRUCTION.

No. 927,497.  Specification of Letters Patent.  Patented July 13, 1909.

Application filed January 10, 1906. Serial No. 295,382.

*To all whom it may concern:*

Be it known that I, EDMUND B. DAILEY, residing at Omaha, in the county of Douglas and State of Nebraska, have invented certain new and useful Improvements in Truck Construction, of which the following is a full, clear, and exact description, such as will enable others skilled in the art to which it appertains to make and use the same.

This invention relates to trucks.

One of the objects thereof is to provide light, rigid and efficient means adapted to support the bolster of a car truck.

Another object is to provide a spring-plank of simple and light construction and of such strength and stiffness as to adapt the same to withstand all conditions of use.

Other objects will be in part obvious and in part pointed out hereinafter.

The invention accordingly consists in the features of construction, combinations of elements and arrangement of parts which will be exemplified in the embodiment thereof hereinafter described and the scope of the application of which will be indicated in the following claim.

Figure 1:
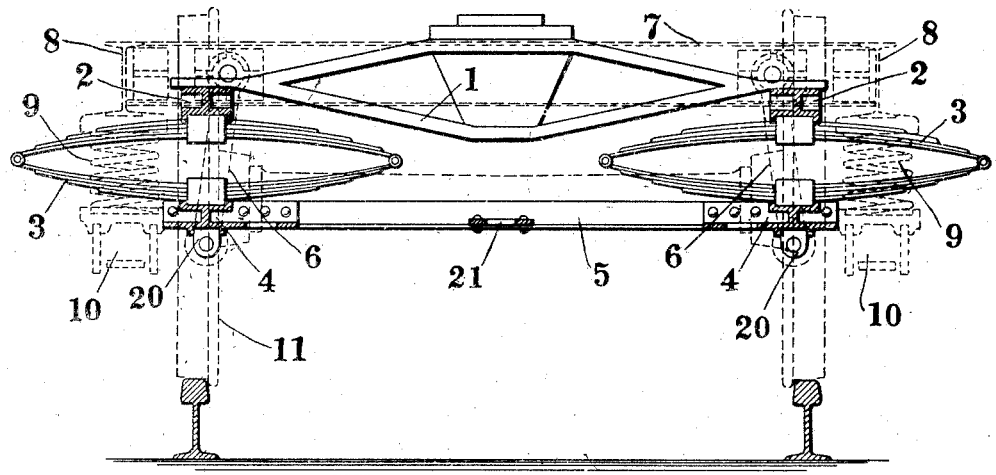
Figures 2, 3:
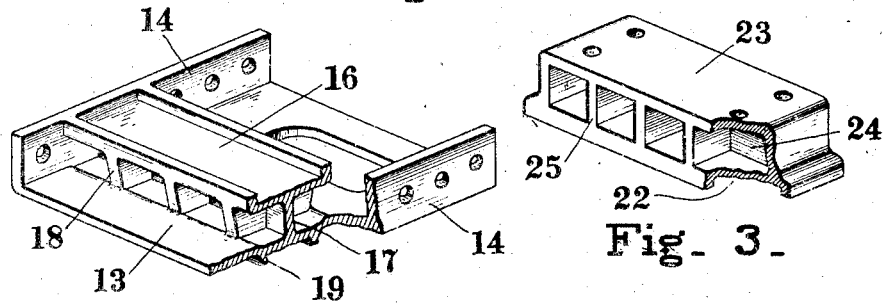
Figure 4:
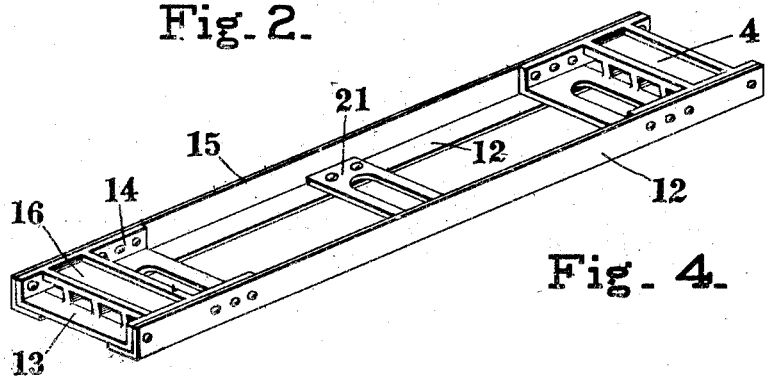

In the accompanying drawings, wherein is shown one of various possible embodiments of my invention, Figure 1 is a sectional elevation of a truck. Fig. 2 is a perspective view of a spring-seat, certain parts thereof being broken away in order to show the construction more clearly. Fig. 3 is a similar view of a spring-cap. Fig. 4 is a similar view of a spring-plank embodying the above spring-seat.

Similar reference characters refer to similar parts throughout the several views.

In order to afford a ready grasp upon the details of this invention, it may here be noted that, with regard to certain specific features thereof, it deals with the problem of providing a spring-plank which is adapted to support and hold in proper spaced relation the springs of a car truck and to withstand all of the considerable stresses brought to bear thereon. Inasmuch as the entire load upon the truck is transmitted through the springs to the spring-plank and, under certain circumstances, as upon the rocking of the car body or rounding of a curve, there are severe additional stresses brought to bear thereon, there is a tendency to make this part of heavy construction. This not only adds to the weight of the truck and wastes metal, but, in the case in which a spring-plank of substantially imperforate or closed construction is used, there is a tendency for snow, ice and other foreign matter to accumulate thereon and not only add useless weight to be carried but interfere with the free action of the parts. The above and other defects are remedied in constructions of the nature of that hereinafter described.

Referring now to the accompanying drawings, there is shown in Fig. 1 a bolster 1, herein appearing in diagrammatic form and resting at its ends upon the spring-caps 2. As the parts upon both sides of the truck are identical, those upon one side only will be described in detail. Spring-cap 2 is secured upon a spring 3, preferably of elliptic form, which is mounted upon a spring-seat 4 built into the spring-plank 5. The latter member is preferably supported by means of swing-hangers 6 upon transoms 7 which in turn are mounted upon the truck side-bars 8 from which the load is transmitted through equalizer-springs 9 and equalizers 10 to the wheels 11, the latter parts being shown in dotted lines only as they form in themselves no part of the present invention and would merely tend to confuse the disclosure if shown in detail.

Spring-plank 5, best shown in Fig. 4 of the drawings, comprises a pair of angle-members 12 each of which has one of its flanges upwardly disposed and the other turned toward the opposite member. Between these members or bars 12, at each end thereof, is mounted the spring-seat 4 which comprises, as is most clearly shown in Fig. 2 of the drawings, a base 13 having flanges 14 adapted to rest against and be secured to the flanges 15 of the angle-bars. Upon base 13 is mounted the spring-seat proper 16 by means of a web 17 extending longitudinally of the seat and having laterally disposed with respect thereto the auxiliary webs or ribs 18. The lower portion of the base 13 is preferably stiffened as by the ribs or lugs 19 which also serve to hold in place the bearing-blocks 20 through which the swing-hangers support the plank. Members 12 are tied together intermediate the spring-seats by a plate 21, preferably of substantially the form shown, which serves to prevent springing or buckling of the angle-members and contributes to the stiffness of the entire plank.

Spring-caps 2, one of which is shown in detail in Fig. 3 of the drawings, comprise the recessed portion 22 connected with the upper plate 23 upon which the bolster rests by means of longitudinal and cross webs 24 and 25, respectively.

It may here be noted that terms of the nature of "spring-plank," "bolster," and the like, are used throughout this specification and the following claim in the ordinary sense which they have acquired in the art with which this invention broadly deals, and that the term "angle-member" or equivalent is used throughout to denote a member provided with longitudinal flanges or webs angularly disposed with reference one to another.

The operation and method of use of the above-described embodiment of my invention, which should be to a large extent obvious, is as follows: Assuming the parts to be mounted in the relation shown, the entire weight of the car is transmitted through the bolster 1 and the spring-cap 2 to the springs 3 which are supported by the spring-seats 4. These seats are suspended by the swing-hangers 6 and from this point the load is transmitted to the rails as has been previously indicated. Owing to the disposition of the flanges of the angle-bars 12, the chances of the plank bending are reduced to a minimum and this without the use of the heavy construction which is now commonly employed. The springs are thus rigidly held in properly spaced relation by means of the recessed seats upon their lower sides and the caps 2, which have similar engagement therewith, at the top.

It will thus be seen that I have provided a construction which is adapted to accomplish the several objects of my invention and that the same is of an essentially inexpensive and yet efficient character. Not only is the weight reduced and material economized, but this is not done at any cost in the strength or stiffness of the parts or their durability and reliability in action. Due to the open construction of the plank, moreover, all chances of natural accumulations gathering thereon with the above-noted disadvantages, are entirely done away with.

As many changes could be made in the above construction and many apparently widely different embodiments of my invention could be made without departing from the scope thereof, I intend that all matter contained in the above description or shown in the accompanying drawing shall be interpreted as illustrative and not in a limiting sense. I desire it also to be understood that the language used in the following claim is intended to cover all of the generic and specific features of the invention herein described and all statements of the scope of the invention, which, as a matter of language, might be said to fall therebetween.

Having described my invention, what I claim as new, and desire to secure by Letters Patent, is:—

In truck construction, in combination, a bolster, springs upon which said bolster is mounted, a spring-plank comprising a pair of angle-members and means adjacent each end of said members connecting the same one with another, said last-mentioned means comprising a base-portion resting between the flanges of said angle-members, a portion having mounted thereon one of said springs, and an intermediate web connecting said first-mentioned portions one with another, transoms, hangers depending from said transoms at each side of said bolster and means connecting said hangers, and seated within said first-mentioned means, and additional spacing means resting upon the lower flanges of said angle members, and fitted between the remaining flanges thereof.

In testimony whereof I affix my signature, in the presence of two witnesses.

EDMUND B. DAILEY.

Witnesses:
    CHARLES L. DUNDEY,
    GEO. G. HOLCOMB.